W. W. ANNABLE.
TRANSMISSION GEARING.
APPLICATION FILED FEB. 20, 1911.

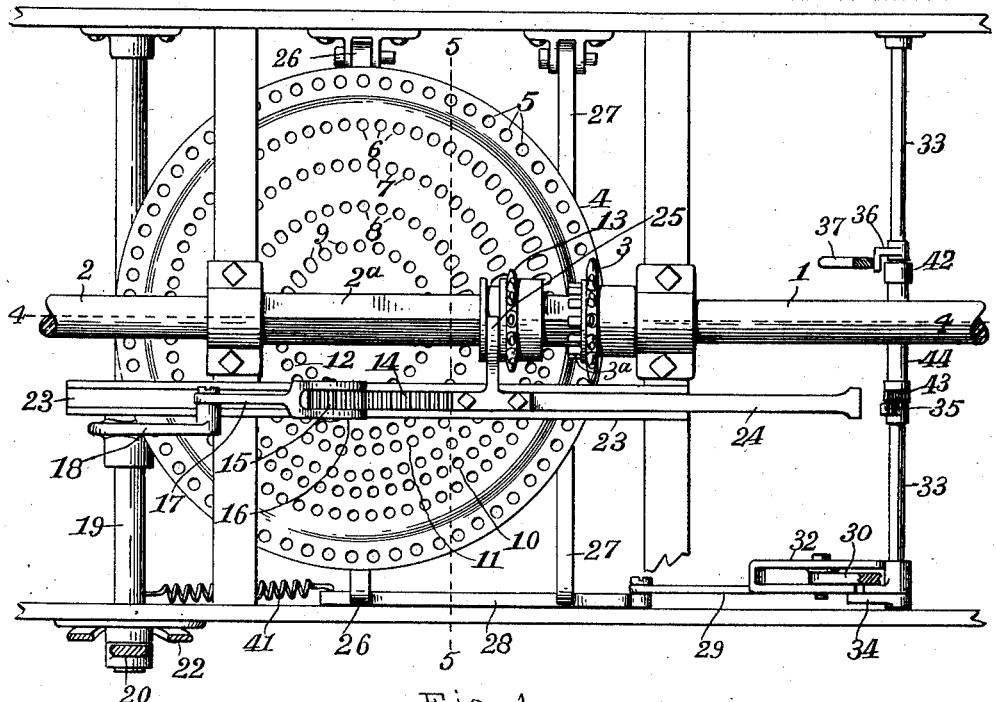

1,043,499.

Patented Nov. 5, 1912.

3 SHEETS—SHEET 2.

Witnesses
Harold O. Van Antwerp
Anna De Windt

Inventor
Warren W. Annable
By Luther V. Moulton
Attorney

W. W. ANNABLE.
TRANSMISSION GEARING.
APPLICATION FILED FEB. 20, 1911.

1,043,499.

Patented Nov. 5, 1912.

3 SHEETS—SHEET 3.

Witnesses
Harold O. Van Antwerp
Anna De Windt

Inventor
Warren W. Annable
By Luther V. Moulton
Attorney

UNITED STATES PATENT OFFICE.

WARREN W. ANNABLE, OF GRAND RAPIDS, MICHIGAN, ASSIGNOR OF ONE-FOURTH TO FRED Z. PANTLIND, OF GRAND RAPIDS, MICHIGAN.

TRANSMISSION-GEARING.

1,043,499.  Specification of Letters Patent.  Patented Nov. 5, 1912.

Application filed February 20, 1911. Serial No. 609,636.

*To all whom it may concern:*

Be it known that I, WARREN W. ANNABLE, a citizen of the United States of America, residing at Grand Rapids, in the county of Kent and State of Michigan, have invented certain new and useful Improvements in Transmission-Gearing; and I do hereby declare the following to be a full, clear, and exact description of the invention, such as will enable others skilled in the art to which it appertains to make and use the same.

My invention relates to improvements in transmission gearing for automobiles and its object is to provide the same with simple and effective means for varying the relative speed of the driving shaft and the driven shaft; automatic means for connecting and disconnecting the shafts and throwing in and out of gear the intermediate transmitting member; to provide automatic means for disengaging the transmission when the brake is applied, and to provide the device with various new and useful features hereinafter more fully described and particularly pointed out in the claims, reference being had to the accompanying drawings in which:—

Figure 3:
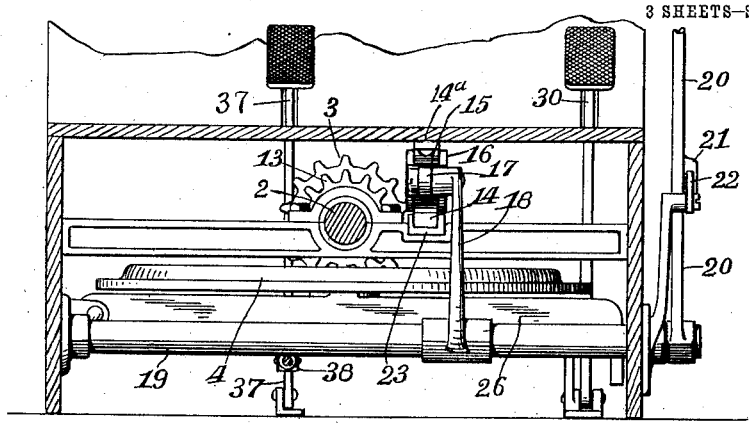
Figure 4:
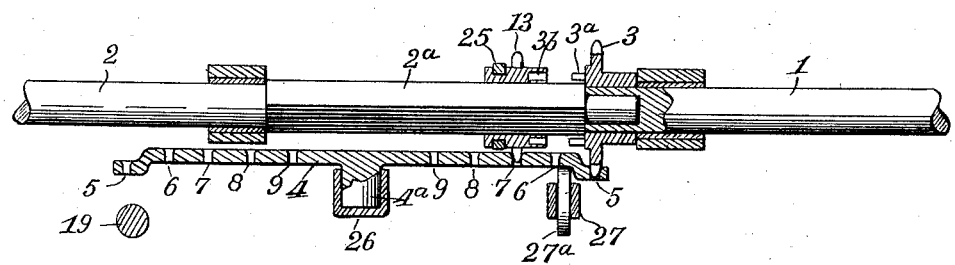
Figure 5:
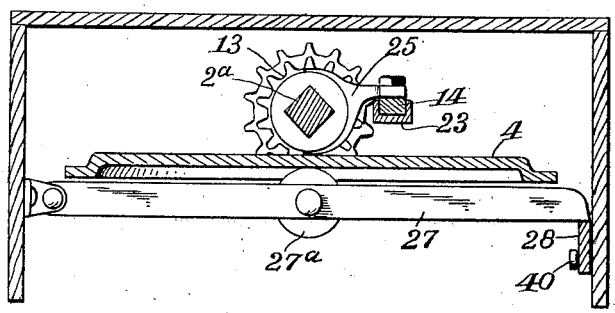
Figure 6:
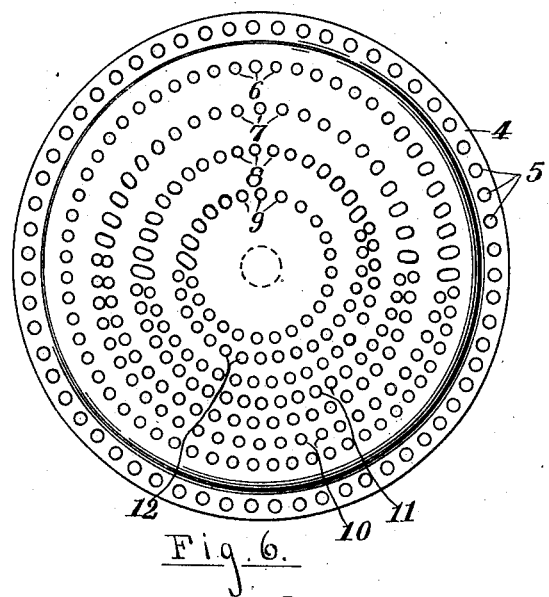
Figure 7:
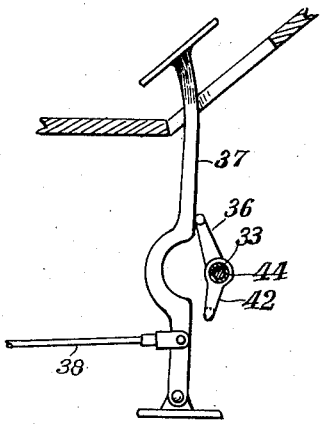
Figure 8:
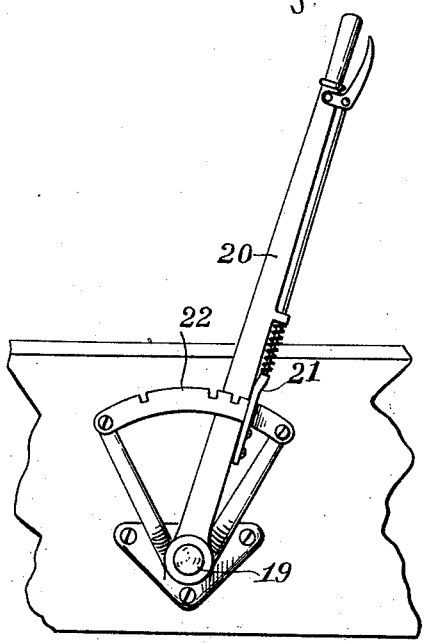
Figure 9:
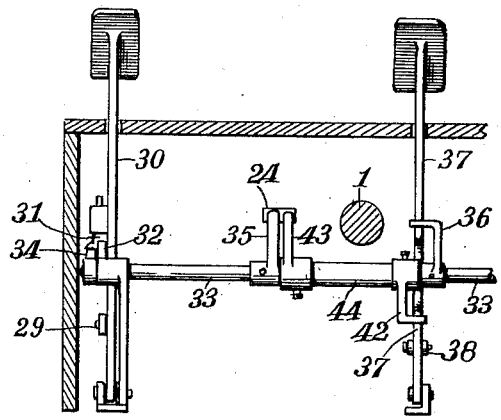

Figure 1 is a plan view of the device embodying my invention with portions broken away; Fig. 2 is a side elevation of the same with a portion of the frame removed; Fig. 3 a rear elevation of the device; Fig. 4 a detail of the driving and driven shafts and the gearing connecting the same; Fig. 5 a detail in vertical section on the line 5—5 of Fig. 1; Fig. 6 a plan of the disk to connect the driving pinion an dthe driven pinion; Fig. 7 a detail of the brake lever and a portion of the trip mechanism; Fig. 8 a side elevation of the speed changing lever and parts connected therewith; and Fig. 9 a front elevation of the brake lever, the disk raising lever, and parts adjacent thereto and operating therewith.

Like numbers refer to like parts in all of the figures.

1 represents the driving shaft to which the engine is attached.

2 is the driven shaft in line with the shaft 1 and having a portion of the same at the end adjacent thereto angular in cross section, as at $2^a$. Fixed on the end of the shaft 1 is a pinion 3 having a clutch member $3^a$ adapted to engage openings $3^b$ in the hub of a driven pinion 13 slidable on the angular portion of the shaft $2^a$.

Instead of being angular, the shaft may be provided with a spline if preferred, whereby the pinion 13 is adjustable longitudinally on the part $2^a$ of the shaft 2 and rotates therewith. The pinion 13 is adjusted by means of a fork 25 engaging a groove in the hub of the pinion and attached to a rack 14 slidable in a grooved way 23. This rack is shifted and held by a pinion 15 engaging the same at one side and engaging a fixed rack $14^a$ at the other side and movable therebetween. This pinion is carried by a yoke 16 having sides overlapping the respective racks whereby the pinion is guided therebetween. This yoke has a connecting rod 17 pivoted to an arm 18 mounted on a rock shaft 19 and the said shaft adjusted by a lever 20 provided with a detent 21 engaging a notched sector 22 to adjust the device for different speeds, or for reverse movement as hereinafter described.

By means of the two racks and the pinion therebetween the throw of the arm 18 may be less than the travel of the rack 14 whereby the device is made more compact than if the rack 14 was moved by direct connection of the arm 18 and a shorter arm can be used, and the rack is also held in the grooved way.

To connect the pinions 3 and 13 a disk 4 is provided having a depressed margin in which is a circular series of openings 5 engaged by the teeth of the driving pinion 3 to drive the disk. Within this series 5 is a series 6 containing the same number of openings. Being of less radius the openings are closer and the pitch diameter of the pinion 13 is less than that of the pinions 3. Each pinion has the same number of teeth and thus when the teeth of the pinion 3 enter the openings 5 and the teeth of the pinion 13 enter the openings 6 the speed of the respective shafts will be the same and the clutch member $3^a$ will enter the openings $3^b$ and connect the two pinions. The clutch member $3^a$ has the same number of teeth as the pinions and will thus engage in any position. If now the disk be lowered the pinions will both be disengaged therefrom and the two shafts connected directly one with the other by means of the clutch members, the device will then be on what is known as "direct drive." The disk is also provided with a series of concentric circles of openings 6, 7, 8 and 9, spaced apart from each other and the openings in each series are spaced apart to receive the teeth of the pinion 13. Each smaller circle thus contains a less number of openings and thus as the pinion is shifted to the various circles, toward the axis of the disk, the speed of the driven shaft is reduced.

To transfer the pinion 13 to opposite the various circular series of openings in the disk without disconnecting the same from the disk eccentrically arranged openings extend between the various circular series as at 10 11 and 12 whereby by manually applying pressure to the lever 20 the teeth of the pinion 13 will traverse these transfer openings from one circular series to another as occasion may require. To reverse the rotation of the driven shaft 2 the pinion 13 is carried across the axis of the disk opposite the inner circular series of openings therein as occasion may require, to provide a slow back-up movement of the car. To engage and disengage the disk with the pinions the disk is mounted on a cross bar 26 and journaled in the same as at 4ª. To support the disk and take the downward strain of the pinions another cross bar 27 extends beneath the disk near the pinion 3 and has a roller 27ª journaled therein supporting and traversing the under side of the disk. These bars 26 and 27 are pivoted to the frame at one end and extend parallel to each other to the opposite side of the frame and are there supported by a lifter 28 having diagonal slots 39 therein, through which extend supporting pins on which the bar is slidable, whereby it is raised and lowered as it is moved on the pins. To lower the lifter, a spring 41 is attached to the lifter and normally moves it to bring the pins 40 in the upper ends of the slots. This drops the bars 26 and 27 sufficiently to carry the disk out of engagement with the pinions this being the normal position of the parts. To raise the disk into engagement with the pinion, a pedal lever 30 is provided connected to the lifter 28 opposite to the spring 41 by a rod 29. This lever is held with the lifter raised by means of a latch 31 engaging a notch in a sector 32. This latch projects laterally from the sector and is engaged by an arm 34 mounted on a rock shaft 33 on which are two other arms 35 and 36. The arm 35 is engaged by an extension 24 on the rack 14 whenever the pinions are brought into the two outer circles of openings and the clutch members engaged. This lifts the latch 31, releases the lever 30 and allows the disk to drop out of engagement with the pinions.

37 is a brake lever connected by a rod 38 to any brake (not shown) and when this lever is operated to apply the brake, said lever engages the arm 36 and thus releases the latch 31 and also allows the disk to drop out of engagement with the pinion, so that either moving the pinion 13 to the direct drive position or applying the brake will automatically disconnect the disk from the pinions. To disconnect the clutch members when the brake is applied, a sleeve 44 rotative on the shaft 33 is provided, and on one end of this sleeve is fixed a downwardly projecting arm 42 engaged by the lever 37, and an upwardly projecting arm 43 to engage the end of the extension 24. Thus when the brake is applied, the clutch members will be automatically disengaged, clearance enough between the arms 42 and 43 and the brake lever 37 and extension 24 is provided so that the extension 24 can engage and move the arm 35 enough to release the latch 31 when the clutch members are engaged. When the lever 20 is moved far enough to engage the clutch members the disk is always disengaged, and there being no notch in the sector 22 for the latch 21 when in this position the brake lever will always operate to disengage the clutch members as described. To reverse the rotation of the driven shaft the disk must be disconnected, the pinion 13 shifted across the axis of the disk and the latter again raised, whereupon the rotation of the shaft 2 is reversed. It will thus be seen that the device is simple, effective, adapted to various speeds, and automatically disconnects the engine whenever the brake is applied and also disconnect the disk whenever moved to direct drive position. Also that the various speeds are quickly and easily increased without disconnecting the disk from the pinions by merely shifting the lever 20 to various proper positions.

What I claim is:—

1. Transmission gearing, comprising a driving shaft, a driven shaft in line with the driving shaft and independently rotative, a pinion fixed on the driving shaft, a pinion slidable on the driven shaft, a rotative disk having two separate series of openings for receiving the teeth of the respective pinions, each pinion and the openings therefor being so proportioned that the driving shaft and driven shaft will rotate at the same speed when the disk is engaged with the pinions, a clutch to connect said shafts automatically engaged when the pinions are opposite said openings and means for engaging or disengaging the disk and the pinions.

2. Transmission gearing, comprising a driving shaft and a driven shaft independently rotative, a pinion fixed on one shaft, a pinion slidable on the other shaft, a disk having a series of openings near the periphery to receive the teeth of the fixed pinion, and several concentric series of openings to receive the teeth of the slidable pinion, the pinions and two respective series of openings being so proportioned that when the pinions are positioned to respectively engage said two series of openings the shafts will be rotated in unison, a clutch to connect said shafts, the clutch being operated by moving the sliding pinion, and means for engaging and disengaging said disk and pinions.

3. Transmission gearing, comprising a driving shaft, a driven shaft in line with the driving shaft and independently rotative, a pinion fixed on the driving shaft, a pinion slidable on the driven shaft, said pinions having an equal number of teeth, a clutch to connect said pinions when they are brought together, a movable disk having two concentric circular series of openings, each series having an equal number of openings, said disk also having several other concentric series of openings of progressively less number of openings to receive the teeth of the slidable pinion, a lever to hold the disk in engagement with the pinions, a latch to hold the lever, and means for adjusting the movable pinion and for disengaging the latch when said pinion is clutched to the driving pinion.

4. Transmission gearing, comprising a driving shaft, a driven shaft in line therewith, a pinion fixed on the driving shaft, a pinion slidable on the driven shaft, a disk below said pinions and vertically movable into and out of engagement therewith, said disk having several concentric circular series of openings to receive teeth of the said pinions, a clutch to connect the pinions when brought together, a slidable member connected to the slidable pinion to adjust the same, a vertically movable support in which the disk is journaled, a lever to raise the support and engage the disk with the pinions, a latch to hold the lever, a rock shaft having an arm to engage and release the latch, a projection on the slidable member, and a second arm on the rock shaft engaged by said projection to release the latch when the pinions are clutched to each other and permit the disk to be disengaged from the pinions.

5. Transmission gearing, comprising a driving shaft, a pinion fixed on the shaft, a driven shaft in line with the driving shaft, a pinion slidable on the driven shaft, a clutch to connect said pinions, a disk having several concentric circular series of openings to receive the teeth of the pinions, a bar extending beneath the disk on which the disk is supported, said bar being pivoted at one end, a lifter supporting the bar at the other end, said lifter being provided with inclined slots and slidable on pins engaging the slots, a spring to move the lifter and lower the bar, a lever attached to the lifter to move the same and raise the bar, a latch to hold the lever, and means for adjusting the slidable pinion and for automatically releasing the latch when the pinions are clutched to each other.

6. Transmission gearing, comprising a driving shaft and a driven shaft arranged in line, a pinion fixed on the driving shaft, a pinion slidable on the driven shaft, a clutch to connect said pinions, a disk having several concentric circular series of openings to receive the teeth of the pinions, a bar extending beneath the center of the disk on which the disk is supported, a second bar extending beneath the disk substantially opposite the pinions, a roller on the last named bar engaging the disk, said bars being pivoted at one end, a lifter supporting the other end of said bars and having diagonal slots therein, pins in said slots on which the lifter is slidable, a spring to move the lifter and lower the disk, a lever to move the lifter and raise the disk, a latch to hold the lever, and means for adjusting the slidable pinion and releasing the latch when the pinions are clutched together.

7. Transmission gearing, comprising a driving shaft, a driven shaft, variable speed gearing adapted to connect said shafts normally in disconnecting position, a lever to hold said gearing in connecting position, a latch to hold the lever, a brake lever, and means for connecting the brake lever to the latch to release the same and permit the gearing to resume the disconnecting position when the lever is moved to apply a brake.

8. Transmission gearing, comprising a driving shaft, a driven shaft, variable speed gearing adapted to connect with both of said shafts normally in disconnected position, a lever connected to said gearing to move the same to connecting position, a latch to hold said lever, a clutch to connect said shafts, a brake lever, and means operated by the brake lever to simultaneously release the latch and disengage the clutch when the brake lever is moved to apply a brake.

9. Transmission gearing, comprising a driving shaft, a driven shaft, gearing adapted to connect and disconnect said shafts, a lever to move said gearing to a position to connect said shafts, a latch to hold said lever, a spring to move said gearing to a position to disconnect said shafts, a lever to apply a brake, a rock shaft, an arm on the rock shaft to engage the latch and release the same, and a second arm on the rock shaft engaged by the brake lever to release the latch.

10. Transmission gearing, comprising a driving shaft, a driven shaft, variable speed transmission gearing and a clutch, each adapted to connect said shafts, a lever adapted to move said gearing to a position to connect said shafts, a spring to move the same to a position to disconnect said shafts, a latch to hold said lever against the tension of the spring, a rock shaft, an arm on the rock shaft to engage and release the latch, a brake lever, an arm on the rock shaft engaged by said lever to release the latch when a brake is applied, means for adjusting the slidable pinion, and an arm on the rock shaft engaged by said means to release the latch when the clutch is positioned to connect the driving shaft with the driven shaft.

11. Transmission gearing, comprising a driving shaft, a driven shaft, a pinion slidable on one shaft, a pinion on the other shaft, a clutch to connect said pinions, a slidable member to adjust the slidable pinion and engage the clutch, a disk movable to engage and disengage the teeth of the pinions, a lever to move the disk into engagement with the pinions, a latch to hold the lever, a brake lever, a rock shaft near the levers, an arm on the rock shaft to engage the latch, an arm on said shaft engaged by the brake lever to release the latch, a sleeve on the shaft, an arm on the sleeve to engage the slidable member, and an arm on the sleeve engaged by the brake lever to disengage the clutch.

12. Transmission gearing, comprising a driving shaft, a driven shaft in line with the same, a pinion fixed on the driving shaft, a pinion slidable on the driven shaft, a clutch to connect the pinions, a disk to connect the pinions and having a number of concentric circular series of openings to receive the teeth of the pinions, means for engaging the disk with the pinions comprising a spring to disengage the disk and a lever to engage the disk, a latch to hold the lever in engaging position, a rock shaft, an arm on the rock shaft to engage the latch and release the lever, a second arm on the rock shaft, slidable means to adjust the slidable pinion, said means engaging the said second arm to release the latch when the pinions are clutched to each other, a brake lever and a third arm on the rock shaft engaged by the brake lever to release the latch when said brake lever is operated to apply a brake.

13. Transmission gearing, comprising a driving shaft, a pinion fixed on the same, a driven shaft, a pinion slidable on the same, a clutch to connect said pinions, a slidable member connected to the slidable pinion to adjust the same and engage the clutch, a disk having several concentric series of openings to receive the teeth of the pinions, means for moving the disk into engagement with the pinions comprising a lever, a latch to hold the lever, a brake lever, a rock shaft near the said levers, a sleeve rotative on the rock shaft, an arm on the sleeve and an arm on the shaft, each engaged by the brake lever to oppositely rotate the sleeve and shaft, an arm on the shaft to engage and release the latch, an arm on the sleeve to engage the slidable member and disengage the clutch, and an arm on the shaft engaged by the slidable member to release the latch when the clutch is engaged.

In testimony whereof I affix my signature in presence of two witnesses.

WARREN W. ANNABLE.

Witnesses:
 HAROLD O. VAN ANTWERP,
 LUTHER V. MOULTON.

---

Copies of this patent may be obtained for five cents each, by addressing the "Commissioner of Patents, Washington, D. C."